March 31, 1953     E. C. OLIVER     2,633,103
HYDRAULICALLY OPERATED MACHINE TOOL
Filed Aug. 20, 1945     5 Sheets-Sheet 4
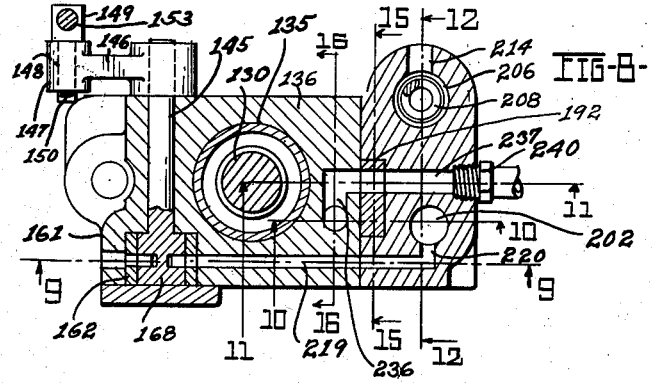
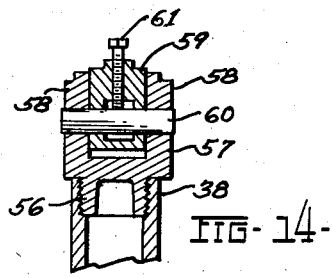
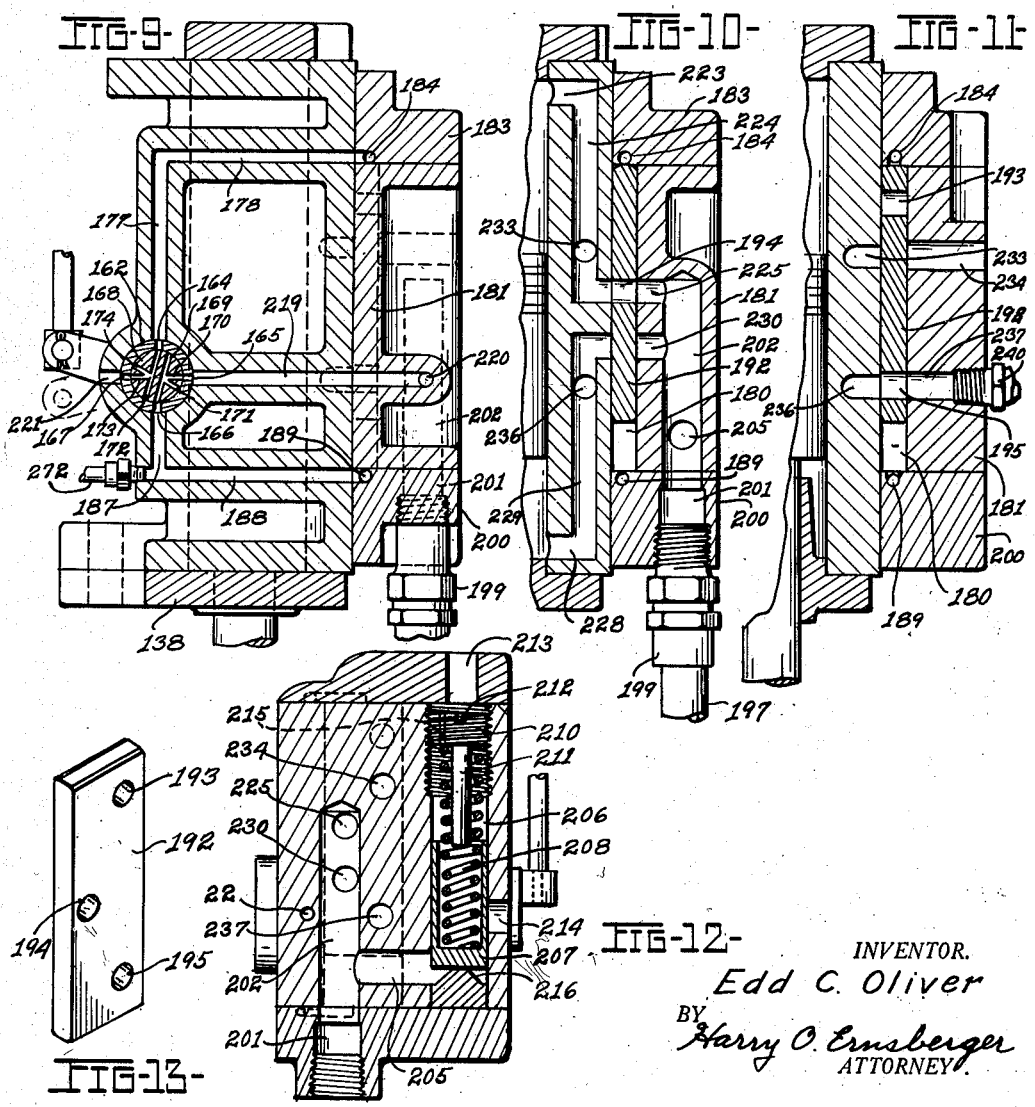
INVENTOR.
Edd C. Oliver
BY Harry O. Ernsberger
ATTORNEY.

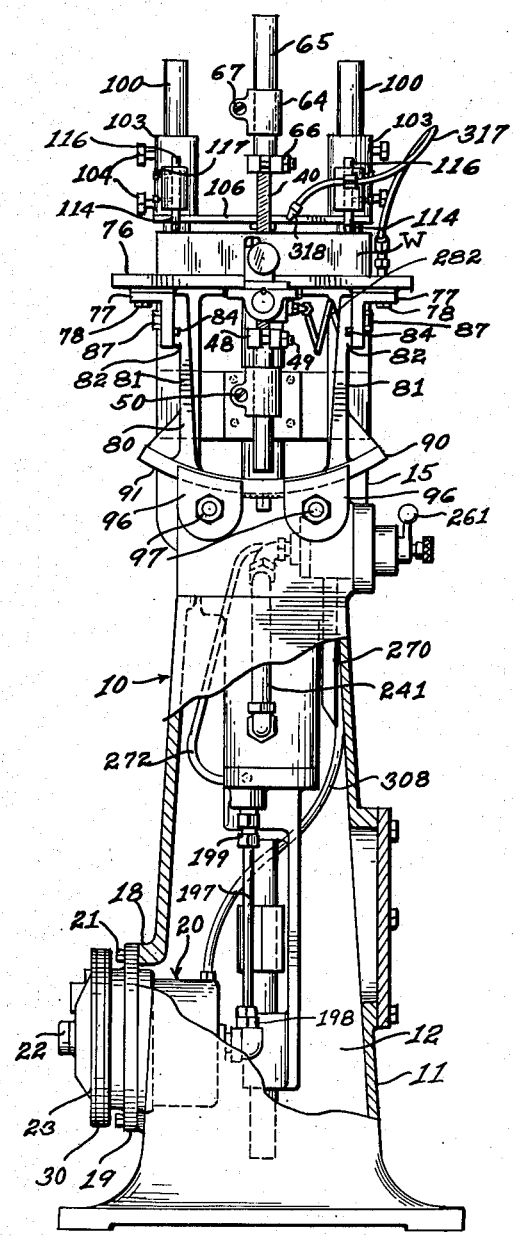

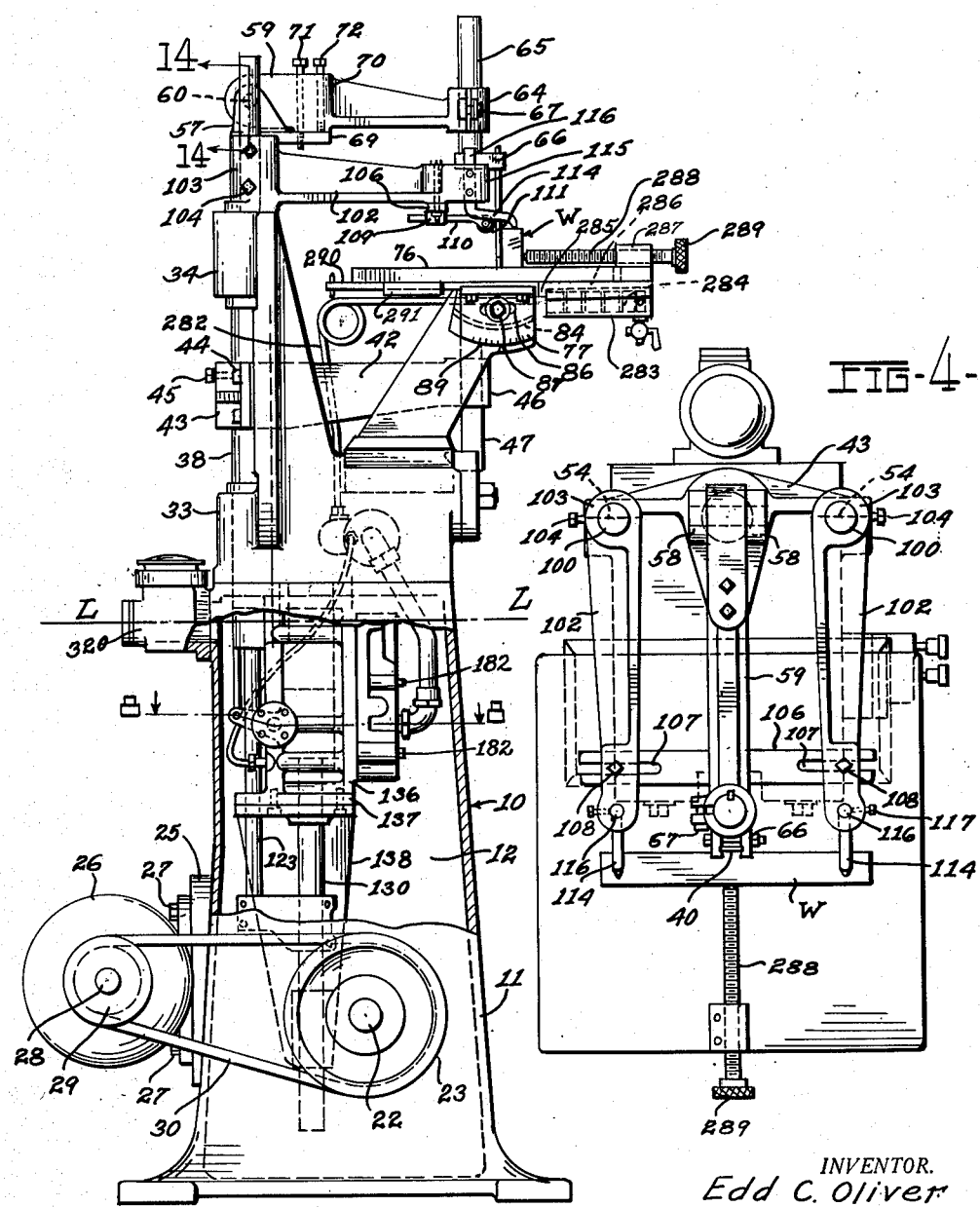

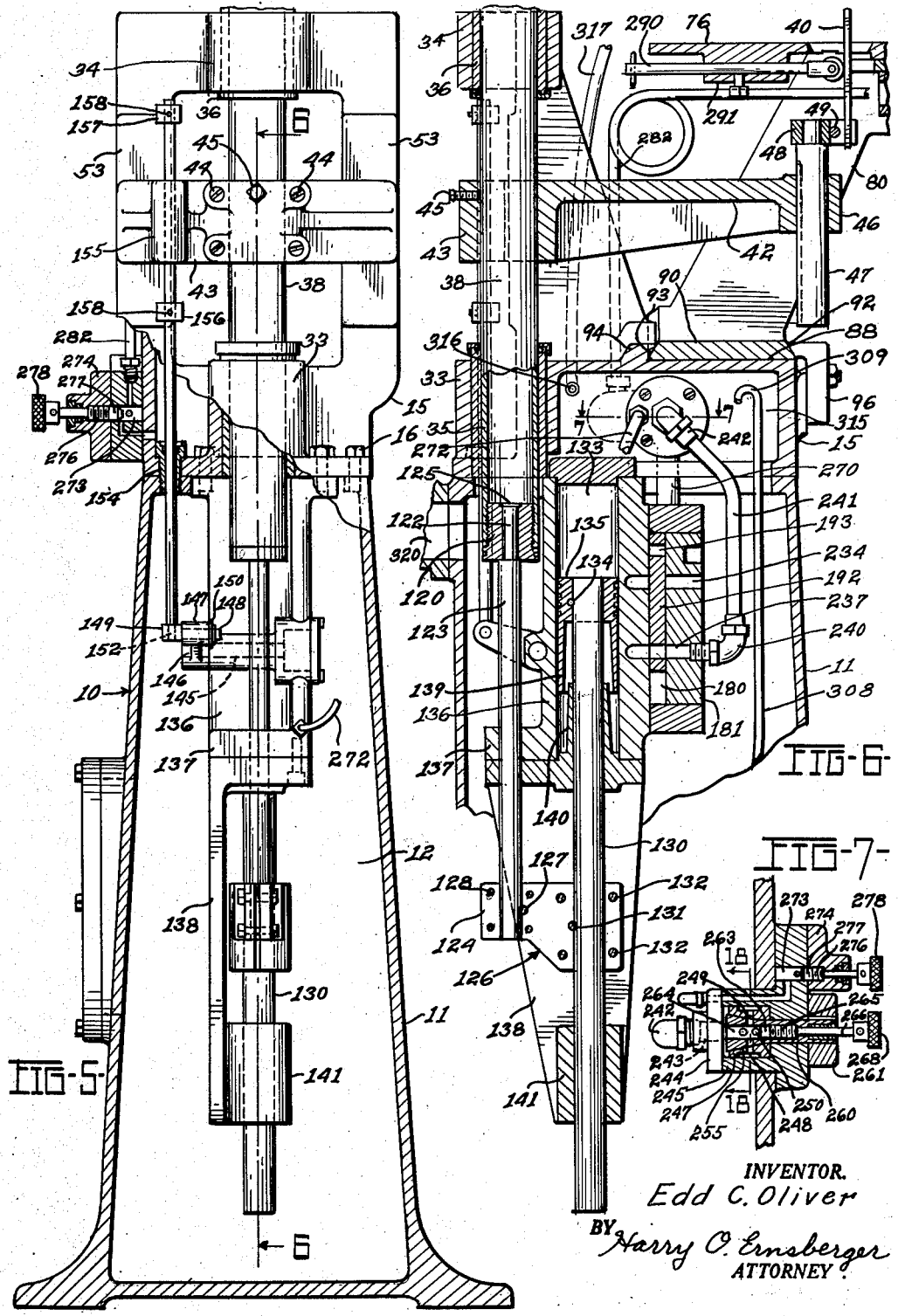

March 31, 1953 E. C. OLIVER 2,633,103
HYDRAULICALLY OPERATED MACHINE TOOL
Filed Aug. 20, 1945 5 Sheets-Sheet 5
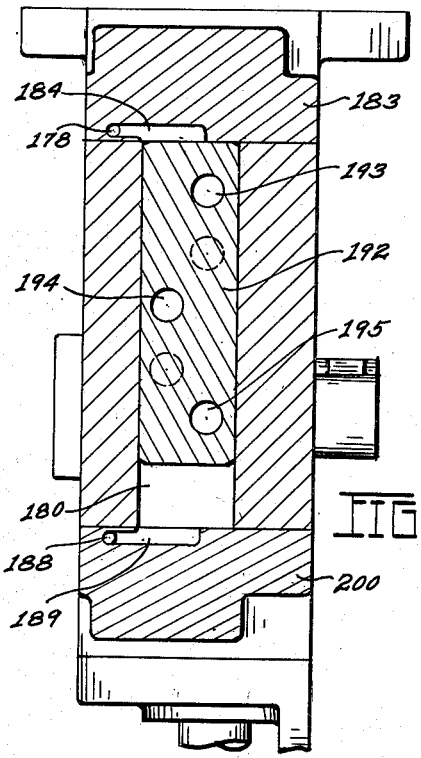
FIG-15-
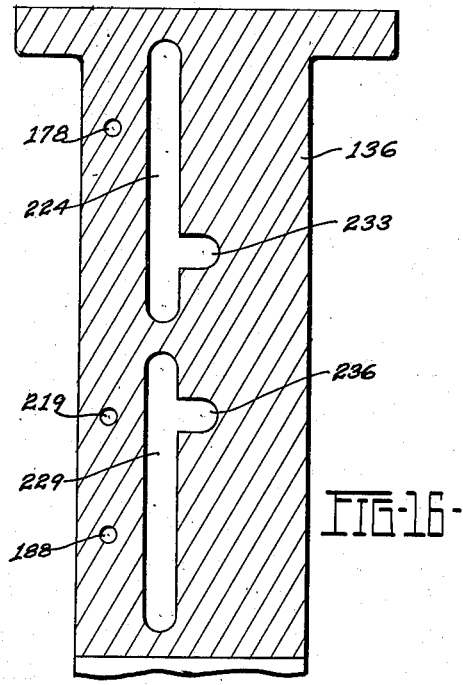
FIG-16-
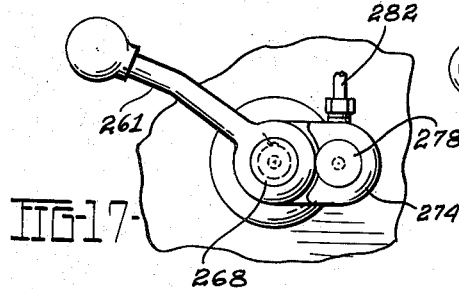
FIG-17-
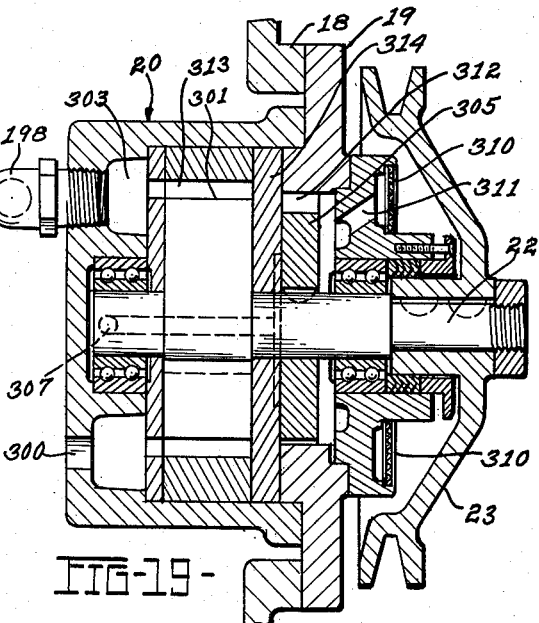
FIG-19-
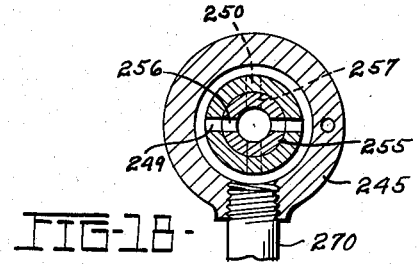
FIG-18-
INVENTOR.
Edd C. Oliver
BY Harry O. Ernsberger
ATTORNEY Patented Mar. 31, 1953

2,633,103

UNITED STATES PATENT OFFICE 2,633,103

HYDRAULICALLY OPERATED MACHINE TOOL

Edd C. Oliver, Adrian, Mich.; Genevieve R. Oliver, executrix of said Edd C. Oliver, deceased, assignor to Genevieve R. Oliver, Adrian, Mich.

Application August 20, 1945, Serial No. 611,626

3 Claims. (Cl. 121—45)

This invention relates to machine tools and more particularly to devices utilizing a reciprocating cutting instrumentality or tool.

The invention comprehends the provision of a machine tool particularly of the type for filing metals or other materials in which the cutting tool is reciprocated by fluid or hydraulic means.

The invention embraces the provision of a machine tool in which a reciprocating cutter or tool is used wherein effective cutting is had in one direction of reciprocation, the tool being actuated by hydraulic means whereby a uniform speed of movement of the cutting tool is obtained throughout its complete effective stroke.

An object of the invention resides in the provision of an hydraulically operated cutting instrumentality of a machine tool in which the speed of operation may be varied by control of the hydraulic means whereby an infinite number of speeds are obtainable for the cutting tool.

Another object of the invention resides in a hydraulically actuated reciprocable means for operating the cutting tool including a piston and cylinder wherein the full area of piston receives fluid pressure for effecting the cutting stroke of the tool, and wherein the piston rod occupies a substantial space on the opposite side of the piston, the latter arrangement providing a limited space to receive fluid and thus effecting a quick return stroke of the cutting tool.

Another object of the invention resides in the provision of a hydraulically actuated reciprocable cutting tool in which the speed of the return or idle stroke is greater than the working or cutting stroke whereby the efficiency of a machine of this character is greatly increased.

Still another object resides in the provision of a hydraulically actuated reciprocable slide valve arranged to control or divert the flow of fluid to and from the cylinder containing the actuating piston or ram.

A further object of the invention resides in the provision of a hydraulically actuated filing machine in which the ram of the machine is hydraulically actuated and in which a work feeding means is arranged to receive fluid pressure impulses only during the effective or cutting strokes of the tool.

A further object of the invention is the provision of a machine employing a reciprocable cutting instrumentality in which the elements are hydraulically actuated thus providing an arrangement utilizing few moving parts and in which wear of the parts is reduced to a minimum.

Still a further object of the invention is the provision of a machine embodying a unitary pump structure arranged to simultaneously pump two different fluids through independent channels.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention.

Figure 1 is a front elevation view of a machine tool embodying my invention;

Figure 2 is a rear elevational view of the machine shown in Figure 1;

Figure 3 is a side elevational view of the machine, a portion of the housing being broken away for purposes of illustration;

Figure 4 is a top plan view of the machine;

Figure 5 is an enlarged rear elevational view of a portion of the machine, certain parts being shown in section for purposes of illustration;

Figure 6 is a vertical sectional view taken substantially on the line 6—6 of Figure 5;

Figure 7 is a detailed sectional view taken substantially on the line 7—7 of Figure 6;

Figure 8 is a horizontal sectional view taken substantially on the line 8—8 of Figure 3;

Figure 9 is a vertical sectional view taken substantially on the line 9—9 of Figure 8;

Figure 10 is a vertical sectional view taken substantially on the line 10—10 of Figure 8;

Figure 11 is a detailed sectional view taken substantially on the line 11—11 of Figure 8;

Figure 12 is a vertical sectional view taken substantially on the line 12—12 of Figure 8;

Figure 13 is an isometric view showing a slidable valve plate forming an element of the invention;

Figure 14 is a vertical sectional view taken substantially on the line 14—14 of Figure 3;

Figure 15 is a vertical sectional view taken substantially on the line 15—15 of Figure 8;

Figure 16 is a vertical sectional view taken substantially on the line 16—16 of Figure 8;

Figure 17 is an end view of the control mechanism illustrated in Figure 7;

Figure 18 is a transversed sectional view taken substantially on the line 18—18 of Figure 7; and Figure 19 is a sectional view through the pump construction arranged to simultaneously pump different fluids, the view being taken substantially on the line 19—19 of Figure 2.

While I have shown my invention in a form of filing or cutting machine it is to be understood that I contemplate the use of my invention with any instrumentality where it may be found to have utility.

Referring to the drawings in detail, the machine is inclusive of a frame structure 10 having two major components viz, a standard or pedestal shaped portion 11 which is of hollow configuration to form a fluid or oil reservoir 12, and upon which is superposed a skeleton frame 15, secured to the pedestal portion by means of screws 16.

As shown in Figures 1, 2 and 3, the pedestal 11 is formed with a laterally projecting boss or flange 18 to which is secured a flange 19 which carries a pump structure 20 for pumping both oil and air as hereinafter described in further detail, the flange 19 being secured to the boss 18 by suitable screws 21.

As shown in Figures 1 and 2 the body of the pump structure 20 is disposed interiorly of the pedestal 11. The pump shaft 22 extends exteriorly of the pump and supports a pulley 23. The pedestal 11 is also integrally formed with the boss portion 25 to which is secured an electric motor 26, the same being held in place by means of screws 27. The shaft 28 of the motor supports a drive pulley 29, pulleys 23 and 29 being connected together by means of a belt 30 whereby the pump 20 may be operated by means of the motor 26. Other suitable sources of power or driving means for the pump may be employed is desired.

The frame structure 15 is formed with a pair of bosses 33 and 34 which are provided with aligned bores or cylindrical openings. The opening in boss 33 is lined with a bearing bushing 35 while the opening in boss 34 is lined with a bearing bushing 36. Disposed in the bearings 35 and 36 is a vertical reciprocable member or tube 38.

The member 38 supports the means for carrying the cutting file 40 or other cutting tool or instrumentality. To this end there is mounted upon member 38 an arm 42 which is secured to a cross head or member 43 by means of a plurality of clamping screws 44, the cross head being positioned on the tube 38 by a screw 45. The arm 42 is formed at its forwardly extending end with a boss portion 46 which is vertically bored to receive the shank 47 of a tool holder. The boss 46 is arranged so that a clamping screw 50 may be drawn up to hold the shank 47 in position. Mounted upon shank 47 is a tool securing member or bracket 48, the tool 40 being arranged to be clamped or secured to bracket 48 by means of a clamp screw 49 or other suitable means.

The frame 15 is formed with a pair of vertical uniplanar surfaces or ways 53 and the cross head or member 43 is integrally formed with pad portions 54, the pad portions being smooth or machined surfaces which engage and slidably reciprocate along the ways 53. The function of this construction is to lend stability to the tool holder and also to properly maintain the lower tool holder in alignment with an upper tool retaining means or holder.

The upper tool retaining means is inclusive of a member 57 which has a threaded tenon portion extending into the threaded interior of the tube or member 38, as shown in Figure 14. Member 57 has a pair of upwardly extending furcations 58 within which is disposed the extremity of an arm 59, the latter being pivotally secured to member 57 by means of a stub shaft 60. The shaft 60 is prevented from dislodgment by means of a retaining screw 61. The arm 59 is formed at its forward extremity with a boss portion 64 which is bored to receive a shank 65 of an upper tool supporting means or holder, the boss portion 64 being arranged to receive the screws 67 in order to clamp the shank 65 of the holder in rigid position in the boss 64. Secured to the shank 65 is a holder member 66 to which may be secured the upper end of the file 40 or other cutting instrumentality. Member 57 is formed with a forwardly extending tongue 69, while the arm 59 has an enlarged portion 70 which is provided with a plain opening to receive a screw 71, a second threaded opening adapted to receive a screw 72. The screw 71 extends into a suitable threaded opening formed in the tongue portion 69 of member 57, while the screw 72 merely engages the upper surface of the tongue 69. By this means, the arm 59 may be pivotally adjusted about the axis of shaft 60, to regulate the tension upon the cutting tool, the adjustment maintained through the locking action of screws 71 and 72.

There will thus be seen that the tool or cutting instrumentality 40 is secured adjacent its ends to tool holders which are carried by arms 42 and 59 so that vertical reciprocatory movement of member 38 carries with it the file 40 or other tool.

Means are provided for supporting the work W or material upon which a filing or cutting operation is to be performed. This means is inclusive of the work supporting table or platen 76 to which is secured a pair of depending L-shaped brackets 77, by means of screws 78. Disposed beneath the work supporting table 76 is a table supporting frame 80. The frame 80 is formed with spaced upwardly projecting portions 81 which terminate in laterally extending bosses 82, each boss 82 being formed with an arcuate recess arranged to receive and accommodate a correspondingly spaced arcuate tang 84 integrally formed on the depending leg of each of the L-shaped members 77, as shown in Figure 1. Each of the L-shaped members 77 is formed with an extended slot 86 to accommodate a clamping screw 87. By this means the work supporting table 76 may be tilted or angularly positioned about an axis extending transversely of the machine as viewed from the front. Thus by releasing the clamping screws 87, the tangs 84 may be moved arcuately in the recess formed in the bosses 82 so that the table may be adjusted to an angular position about a transverse axis, after which the clamping screws 87 may be drawn up to securingly retain the table in such angular position. A series of indicia 89 are provided upon the curved lower edge of one of the L-shaped members 77 to indicate the degrees of tilt that may be imparted to the work supporting table 76.

The frame 15 is formed with a partial cylindrical surface or arcuate way 88, as shown in Figure 6, and the table supporting frame 81 is formed with a sector shaped portion 90 having a correspondingly curved lower surface 91 which fits in the curved surface or way 88. It should be noted that the fore and aft edged walls of the arcuate portion 90 are chamfered as at 92 and 93, the rear chamfer 93 engaging a reciprocally shaped surface formed on a boss 94 forming a part of the main frame 15 which serves to guide the table supporting frame 80 in its arcuate movements about a central axis extending fore and aft of the machine. Arranged forwardly of the frame 15 is a pair of clamps or locking means 96, as shown in Figure 6, having angularly shaped surfaces which are engageable with the angular surface 92 on portion 90 to clamp the table supporting frame 80 in adjusted position. Each of the clamps 96 is held in clamping position by means of screws 97.

Thus by means of the supporting arrangement for the work supporting table or platen 76 by the L-shaped members 77 and the means of mounting the table supporting frame 80 upon the main frame 15 as above described, the table 76 is capable of being adjusted to angular positions in both directions, thus providing an effective universal mounting for the work supporting table 76 so as to accommodate all types and shapes of work upon which filing or cutting operations may be performed.

The main frame 15 is provided with a pair of upwardly extending stub shafts or rods 100 which are secured in parallel bores formed in the upper portion of frame 15 as shown in Figure 2. Mounted upon each of the shafts 100 is a forwardly extending bracket or arm 102 having a boss portion 103 which is bored to snugly, yet slidably, fit the shafts 100. Each of the arms 102 may be fixedly secured in adjusted position upon a shaft 100 by means of clamping screws 104. A bar 106 is arranged to connect the arms 102 as shown in Figures 1, 3, and 4, the bar being provided with longitudinally extending slots 107 which are adapted to cooperate with screws 108 to secure the bar 106 to the arms 102. The bar 106 is thus rendered transversely adjustable through the medium of the slots 107 and the clamping screws 108. Secured centrally of the bar 106 is a member 109 which provides a support for shank 110 which carries at its forward end a roller 111 or other suitable means for backing up or resisting rearward thrust of the cutting file 40 or other cutting instrumentality. The shank 110 is adjustable fore and aft through the clamp 109 so that the roller 111 may be properly adjusted to engage the file 40. The roller 111 may be adjusted transversely of the machine by adjusting the transverse position of the bar 106.

A convenient work retaining or "hold-down" means is provided in the form of work engaging members 114 carried in bosses 115 formed in the forward extremities of brackets 102. Each of the members 114 is provided with a shank 116 which is adjustably carried by the arms 102, the shanks being arranged to be locked or clamped in adjusted position by means of screws 117 or other suitable means as particularly shown in Figures 3 and 4. The clamps may be adjusted into tight engagement with the work W so that the work will not be dislodged during the reciprocations of the file 40 and particularly during the idle or return movement thereof.

The vertically reciprocable member or ram 38 is arranged to be actuated by hydraulic means. The lower extremity of the hollow member 38 is internally threaded to receive an anchor or plug 120, which is formed with a cylindrical recess to receive a tenon 122 formed at the upper extremity of a rod 123, the upper end of the tenon 122 being swaged as at 125, into engagement with the upper portion of the plug 120 so as to secure the rod 123 and plug 120 in permanent assembled relation.

The lower end of rod 123 projects between two similarly shaped clamps or brackets 124 forming a connecting means 126, the rod being held therein by means of a drift pin or key 127 and a plurality of clamping bolts 128. The connecting means 126 is also arranged to accommodate a piston rod 130, the latter being fixedly secured to clamps 124 by means of a drift pin or key 131 and a plurality of clamping bolts 132.

The upper end of the piston rod 130 is fixedly secured by means of a drift pin or key 134 to a piston or plunger 135 which is adapted for vertical reciprocation within a cylinder 133 formed in a member 136, the latter being secured to the frame portion 15 of the machine. The member 136 is provided with a flange 137 to the lower surface of which is secured a depending member 138. The member 138 is formed at its upper extremity with a frusto-conically shaped boss or projection 140, and at its lower end with boss portion 141. Both of the bosses 140 and 141 are bored to receive and slidably accommodate the piston rod 130 so as to properly guide the latter during its reciprocal movements. The piston 135 is formed with a walled skirt portion 139 which, when the piston is in its lower-most position surrounds the frusto-conically shaped boss 140.

It will be noted that since the piston 135 is reciprocated vertically by hydraulic means in a manner to be hereinafter explained, the rod 130 is movable therewith and through the medium of the member 126, vertical reciprocation is imparted to the rod 123 and the tool carrying ram or member 38.

The hydraulic means and intercalated elements are so arranged as to obtain complete control of the operation and speed of reciprocation of the cutting device in a manner which will now be described.

The member 136 is transversely bored to receive shaft 145, a portion of the shaft extending exteriorly of member 136. Fixedly secured upon the projecting portion of shaft 145 is a bell crank 146, the bell crank being formed at its outer extremity with a boss 147 which is bored to accommodate a cylindrical tenon 148 which is integrally formed as a part of a rectangularly shaped member 149, the tenon 148 being held in assembled relationship with the arm 146 by means of a cotter key 150. Member 149 is provided with a bore adapted to receive a tenon 152 formed on the lower extremity of a vertically disposed rod 153. The end of the tenon 152 is swaged to fixedly secure the rod 153 to the member 149. The rod is maintained in a vertical position by means of a guide bushing 154, the rod also extending through an opening formed in a boss 155 forming a part of crosshead 43, the rod being arranged for slidable movement in both the bushing 154 and the boss 155. Disposed above and below the crosshead 43 are stops or abutments 156 and 157 which are mounted upon rod 153 and are adjustable thereon by means of screws 158. As will be hereinafter explained the vertical reciprocable movement of the crosshead 43 alternately engages the abutments 156 and 157 to actuate the bell crank arm 146 and oscillate the shaft 145.

The member 136 is formed with an enlarged portion 161 provided with a cylindrical recess within which is pressed or snugly fitted an annular bushing 162. The bushing 162 is provided with four openings 164, 165, 166 and 167 spaced radially approximately 90 degrees apart. Disposed within the hollow interior of the annular bushing 162 is an enlarged portion 168 which is formed with a series of passageways 169, 170, 171, 172, 173 and 174. The several passageways in the portion 168 are for the purpose of reversing the direction of flow of fluid through certain channels to effect a reversal in direction of movement of piston 135, and to control an hydraulic work feeding device.

The member 136 is formed with a passageway or fluid passage 177 in communication with passage 164 in the bushing 162 and in communication with horizontal passages 178 and 184, the latter terminating adjacent and in communication with a rectangular recess or chamber 180 formed in a member 181 which is secured to member 136 by means of screws 182. Superposed upon member 181 is a cap 183 in which is formed the channel 184.

Member 136 is also formed with a vertical passage 187 which is in communication with an opening 166 and a horizontal passage 188, the latter being in registration with channel 189 formed in a lower cap member 190, channel 189 being in communication with the lower end of the chamber 180 formed in member 181. Slidably positioned within the rectangular recess or chamber 180 is a rectangularly shaped slidable valve or valve plate 192 which is arranged for limited vertical reciprocation in the chamber 180, under the influence of hydraulic pressure, the valve plate 192, which is illustrated in Figure 13, being provided with transverse openings or ports 193, 194 and 195.

A tube 197 is connected to the oil pressure side of the pump 20 or other source of fluid pressure by means of a coupling 198, the upper end of the tube 197 being connected by means of a second coupling 199 to member 200 which is disposed beneath the member 181 and is secured by screw threads to member 136. Member 200 is formed with a passage 201 in communication with tube 197 and with a manifold or passage or chamber 202, which is shown in Figures 10 and 12. Also in communication with passage 202 is a horizontal passage 205 which terminates in a cylindrical vertically disposed well 206 in which is positioned a pressure relief means for maintaining a uniform fluid pressure in the hydraulic system. This means is inclusive of a sleeved plunger 207 within the hollow portion of which is disposed an expansive coil spring 208. The walls of the upper portion of the well 206 are threaded to receive a plug or threaded member 210 which is integrally formed with a stem or tenon 211 for maintaining the spring 208 in a normal position. The plug 210 is formed with a kerf 212 to receive a suitable tool through an opening 213 in member 183 whereby the plug may be rotated to adjust the expansive pressure exerted by spring 208 upon the plunger 207 in order to regulate the pressure to be maintained in the fluid system. A vent opening 215 is provided in the plug 210 to prevent fluid pressure building up in the well 206 above the plunger 207. The wall of member 181 adjacent the plunger 207 is formed with a relief port 214 as shown in Figures 8 and 12, so that when the fluid pump developes hydraulic pressure in the passages 202 and 205, the spring 208 is compressed by the fluid pressure acting beneath the plunger 207 and moving the plunger upwardly so as to uncover the outlet port 214 and permit the extrusion of fluid in to the reservoir 12 whereby the pressure in the fluid system is thus controlled or regulated by the spring 208, the effective pressure of the latter being controlled by the relative position of the plug 210. The stop member 216 is disposed in the lower end of the well 206 to normally elevate the plunger 207 to the position shown in Figure 12, so that the fluid pressure may exert an upward pressure upon the plunger 207.

The opening 165 in the bushing 162, as shown in Figure 9, communicates with a passageway 219 formed in members 136 and 181 and a passage 220 which registers with the manifold passage or chamber 202. The passage 167 in the bushing 192 is in communication with a vent or outlet 221.

The upper end of the cylinder 133 is in communication with connecting passageways 223 and 224, and when the valve plate 192 is in its upper-most position, as shown in Figure 10, the port 194 therein establishes communication between passage 224 and passage 225 which opens into the manifold chamber 202. The lower end of the cylinder 133 is connected by passages 228, 229 and 230 only when the slide valve is in a lowered position whereby the port 194 in valve plate 192 is in registration with the passage 230.

Means are provided for exhausting fluid or oil alternately from the ends of the cylinder 133. As shown in Figures 10, 11 and 16, the passageway 224 is in communication with a transverse passage 233 which is in alignment with an outlet passage 234. When the slide valve 192 is in its lower-most position, the port 193 therein is in registration with the passageways 233, and 234 to provide an exhaust passage to convey fluid from the cylinder 133 above the piston 135 when fluid under pressure is being forced beneath the piston through the passageways 228, 229, 230 and the port 194 in the valve plate 192. In this manner, the fluid above the piston is expelled out of the passage 234 into the reservoir 12 formed in the pedestal 11 of the machine, when the piston is moved upwardly. When the valve plate 192 is in its upper-most position, a fluid exhaust passage is established from the lower end of the cylinder 133 through passages 228, 229, 236, and 237 by reason of the port 195 in the valve plate being in registration with passages 236 and 237 as shown in Figure 11. In this manner, the fluid below the piston is expelled through the passages 237 when fluid is injected under pressure from manifold 202, passage 225, port 194 in valve plate 192, and passages 224 and 223 into the upper end of the cylinder 133. The exhaust fluid flowing through the passage 237 is conveyed to a controlling and speed regulating means in a manner hereinafter explained.

The arrangement is inclusive of simple, yet effective means for controlling the operation and speed of the piston 135 and hence the speed of the cutting stroke of the file 40 or other cutting instrumentality. To this end a fitting 240 is threaded into the passage 237 in the member 181 as shown in Figure 6, the fitting being connected to a tube 241 which is connected by means of a second fitting 242 which is threaded into a passage 243 formed in a plate 244, as shown in Figure 7, the plate being secured to a housing 245 enclosing valve mechanism. Snugly fitted in a cylindrical recess formed in the housing 245 is an annular member 247 which is formed with a peripheral recess 248 and a series of diametrically disposed passages 249 and 250 as shown in Figures 7 and 18. The member 247 is formed with a conical recess to receive a conically shaped portion 255, the latter having passages 256 and 257 which are adapted, upon rotation of member 255, to be brought into or out of registration with the passages 249 and 250. The conically shaped member 245 is formed with a projecting shank 260 and keyed to the outer end of the shank 260 is a manipulating arm 261 as shown in Figure 17. By rotating the valve member 255 the flow of fluid through the tube 241 may be permitted or stopped as desired. Means are also provided for regulating the flow of fluid through the valve mechanism to vary the speed of the down stroke of the piston 135. This means is inclusive of a supplemental valve plunger 263 movable in the bore or passage 264 with a tenon portion 265 threaded into an interior bore contained within the valve member 255. A stem 266 projects exteriorly of the control member 261 and pinned or otherwise secured to the end of the stem is a manipulating knob 268. By manipulating the knob 268 and hence moving the plunger 263 longitudinally in the passage 264 the plunger may be brought to position to partially or completely obstruct one or more of the passages 249, 250 to thereby decrease the amount of fluid which may be discharged through these openings through the exit tube 241 into the reservoir 12. If the operator wishes to stop the reciprocation of the cutting tool he simply moves the control arm 261 until the openings in the cone shaped portion 255 of the valve are out of registration with the openings 249, 250 in the stationary bushing 247. This may be accomplished without disturbing or changing the adjustment of the cutting stroke speed control knob 268. Thus when the operator wishes to resume operation of the machine, he simply moves the lever 261 until the openings in valve member 255 are in registration with the existing openings in the bushing 247 and fluid beneath the piston 135 may be discharged through these openings, the rate of discharge being dependent upon the relative position of the speed control means 268. Thus it will be seen that the operation of the machine is controlled by manipulation of the lever 261, and the speed of the downward stroke of the piston, which moves the file or tool 40 through its cutting stroke, is controlled and regulated by manipulation of the knob 268.

The arrangement of the invention is also inclusive of a hydraulically actuated impulse means for imparting a pressure to the work for urging the work toward the file or cutting tool at each downward or cutting stroke thereof. To this end, the passage 188 is in communication with a tube 272 leading to a valve chamber 273 contained in the member 245 as shown in Figures 5 and 7. The member 245 is provided with a plate 274 which has a threaded bore to receive a threaded shank 276 of a valve or plunger 277, the latter being longitudinally movable by rotating member 276 through the medium of a manipulating knob 278. The valve chamber 273 in the housing 245 is in communication with a tube 282 which is preferably thin walled having a high degree of flexibility as the upper portion of the tube moves with the work table or platen 76. The extremity of the tube 282 is in communication with a cylinder 283 as shown in Figure 3, a piston 284 being slidably disposed in the cylinder 283 whereby at each downward stroke of the file or cutting instrumentality pressure through the medium of the fluid is impressed upon the piston 284 giving the latter an impulse toward the cutting instrumentality. As the end of the piston 284 is in engagement with an abutment 285 secured to slide 286 on which is mounted member 287, the latter having a threaded opening to threadingly receive a work engaging screw 288, it will be seen that each pressure impulse is therefore imparted to the work W through the means of these elements. The fluid pressure is only effected upon the work engaging member during the "down-stroke" or cutting stroke of the file or tool 40, the period during which fluid pressure is effective upon piston 284 being determined by the position of the reversing valve 168 shown in the Figures 8 and 9.

The pump arrangement 20 shown in Figures 1 and 19 is constructed so as to deliver oil or other liquid under pressure to the hydraulic means hereinbefore described and simultaneously deliver air under pressure for the purpose of removing cuttings from the work adjacent the cutting tool 40. To this end, the pump housing is provided with an oil inlet 300 to receive oil from the reservoir 12, a vane type pump 301, the vanes of which are adapted to be rotated with the shaft 22 and to force oil under pressure through the outlet 303, fitting 198, and tube 197 to actuate the mechanisms hereinbefore described.

Also, mounted upon shaft 22 is a rotor 305 which carries vanes (not shown) whereby air is delivered to an outlet 307 through a tube 308 to a point above the level of the oil in the reservoir 12, the tube 308 terminating in an inverted hook-like extremity 309 whereby air pressure is maintained above the oil level in the reservoir 12. The annular air inlet to the air pump construction is provided with a filter 310, the air being conveyed by means of passage 311 to the air pumping chamber 312, the latter being separated from the oil pumping chamber 313 by means of a wall 314. The air in the chamber 315 above the oil in the reservoir 12 is conveyed through an opening 316 in the wall of frame 15 and through a tube 317 to a nozzle or discharge 318 as shown in Figure 1. The tube 317 is flexible so that the nozzle may be adjusted to direct a jet of air upon the work adjacent the cutting tool 40 in order to prevent cuttings or filings from accumulating upon the work. By conveying the air through tube 308 to a point above the oil as shown in Figure 6, any oil which may be entrained with the air tube 308 is discharged into the reservoir so that the air which passes through the outlet 316 and tube 317 will be oil free.

I have found it preferable to maintain the oil level at a point about even with the oil filter tube 320 indicated by the line L—L in Figure 3, although the level of the oil may be below this level without interfering with the operation of the hydraulic mechanism. It is desirable, however, to maintain a substantial quantity of oil in the reservoir 12 as the oil, during working operations, becomes heated through the dissipation of work energy, and by utilizing a large quantity of oil, a lower temperature is maintained.

The operation of the machine is as follows:
A work piece W, upon which a cutting or filing operation is to be performed, is disposed in position upon the platen or table 76 as shown in Figure 3. The clamping or hold-down devices 114 are adjusted into engagement with the work piece W by manipulation of the screws 117. The work piece is in juxtaposition to the file 40 or other cutting instrumentality, and is given frontal support by manipulation of the screw 288 by means of a manipulating knob 289. The file or cutting instrument 40 is carried at its upper end by means of clamp 66 carried by rod 65 and arm 59, the file being secured at its lower end to a clamp 48 carried by rod 47 which in turn is mounted upon an arm 42. The file 40 is supported rearwardly by means of a roller (not shown) carried at the forward end of a rod 290 which is adjustably in a projection 291 disposed beneath and secured to table 76. Initial tension is placed upon the cutting instrument or file 40 by manipulation of the adjusting screws 71 and 72 carried by arm 59 as shown in Figure 3. Whenever the piston 135 is reciprocated, corresponding reciprocatory movement is imparted to the rod 123 and to rod 38 and arms 42 and 59 to reciprocate the cutting instrument 40.

In the use of the machine, the motor 26 is first energized from a source of electrical energy (not shown) which through the medium of the belt 30 drives the pump 20 arranged to deliver oil and air under pressure. The rotation of the pump 20 conveys oil under pressure through the supply pipe 197 to the manifold chamber or passage 202, and if the operating valve control lever 261 shown in Figure 17 is turned to "off" position, the oil pressure builds up in the manifold passage 202 and passage 205 (see Figure 12) elevating the sleeved plunger 207 until the passage 205 is in communication with the outlet 214 permitting oil to flow into the resevoir. By this means, a pre-determined oil pressure is maintained in the passage 202, the amount of pressure being dependent upon the adjustment of the member 210 which regulates the force exerted by the spring 208 acting downwardly upon the plunger 207.

To initiate a filing or cutting operation upon the work W, with the pump 20 in operation, the machine operator manipulates the operating valve control lever 261 to establish fluid communication through the tube 241, an annular chamber 248 with the fluid discharge tube 270, shown in Figure 1. Assuming that the piston 135 and the slidable valve plate 192 are in the position illustrated in Figure 6, and as shown in Figures 10 and 11, the passage 236, in communication with the passage 229 returning to the lower end of the cylinder 133, is in registration with the port 195 in the valve plate 192 so that oil may flow from the space in the cylinder 133 beneath the piston 135 through the passageways 228, 229, 236, valve port 195, passage 237 and tube 241 thence through the valve mechanism contained in the housing 245, the oil being discharged into the reservoir 12 through the downwardly extending tube 270. The oil beneath the piston is forced through these passages by reason of oil under pressure being injected in to that portion of cylinder 133 above the piston 135 through the manifold chamber 202, passage 225, port 194 in the valve plate 192, and passages 224 and 223 in to the upper part of the cylinder, as shown in Figure 10. The arm 42, shown in Figures 5 and 6, moves downwardly with the piston 135, this downward movement continuing until the crosshead 54 secured to the arm 42 engages the stop or abutment 156 carried upon the rod 153. The crosshead 54, engaging abutment 156, moves the rod 153 and swings the arm 146 to the position indicated in dotted lines in Figure 9. This movement of the arm 146 reverses the valve mechanism contained within the annular sleeve 162 shown in Figure 9. This movement of the valve brings the valve passage 169 into communication with the port 164 and passages 177, 178 and 184, that latter terminating in a port disposed above the sliding valve plate 192. Simultaneously the passage 171 in communication with passage 169, is moved into registration with port 165 in the annulus 162, which in turn is in communication with passages 219 and 220 so as to permit oil under pressure from the manifold chamber 202 to flow through passages 220, 219, 165, 171, and 169 to direct fluid under pressure to a point above the upper end surface of the valve plate 192. This fluid pressure acts to drive the slide valve 192 downwardly to its lowermost position. Simultaneously with this downward movement of the valve plate 192, the fluid in the chamber beneath the valve plate when the latter is in its upper-most position is extruded or exhausted through passages 189, 188, 172 and 174 through the fluid exhaust outlet or port 221, as shown in Figure 9, so as to relieve the fluid pressure beneath the valve plate 192 and permit the oil, previously contained therein to be diverted into the reservoir 12 through the exhaust port 221.

When the valve plate 192 reaches its lower-most position, the exhaust port 193 therein is in registration with the passages 233, and 234 so as to permit oil, previously under pressure in the space above the piston 135, to flow through passages 223, 224, 233, valve port 193 and exhaust outlet passage 234, whence the oil falls by gravity into the reservoir 12. Simultaneously the valve port 194 in the valve plate 192 is moved into registration with passage 236 so that oil under pressure may then flow from the manifold chamber 202 through passage 230, inlet port 194, passages 229 and 228 into the cylinder 133 beneath the piston 135. The oil under pressure entering beneath the piston forces the latter upwardly at a very rapid rate. The reason for the rapid movement of the piston in its upward direction is that the piston rod 130, as shown in Figure 6, occupies a considerable space beneath the piston so that the remaining space available to receive oil under pressure is very much less than the space above the piston 135. In this manner the return stroke of the file or cutting instrument is extremely rapid, because a lesser quantity of oil is required to elevate the piston 135.

Near the completion of the upward movement of the arm 42 and crosshead 54, the latter engages the abutment 157, crosshead 54 thereafter moving the rod 153 upwardly through a vertical distance to the position shown in full lines in Figure 9. In this position as shown in Figure 7, oil under pressure from the manifold chamber 202 flows through passages 220, 219, 165, 169, 166, 187, and 189 to a point beneath the lower end surface of the valve plate 192, the fluid pressure forcing the valve plate 192 upwardly to the position shown in Figures 10 and 11. With the reversing valve 168 in this position the oil under pressure may again flow from the manifold chamber 202 through passage 225, port 194 and passages 224, 223 to inject oil into the cylinder 133 above the piston to drive the latter and the cutting tool or file downwardly to perform a cutting stroke upon the work piece W.

It should be noted that during the period when the oil inlet port 194 in valve plate 192 is in position to admit oil above the cylinder, the valve plate closes the exhaust passage 233, the exhaust port 195 of the valve plate opening the exhaust passages 236 and 237 whereby spent oil disposed in cylinder 133 beneath the piston is diverted by tube 241 to the control valve mechanism. In the arrangement of my invention the speed control valve means associated with the operating valve mechanism is employed to regulate the rate of flow of oil being exhausted from the space beneath the piston 135, and in this manner the speed of movement of the piston is controlled in its downward movement only. Thus by manipulating the knob 268 the supplemental valve plunger 263 may be moved to a point where a large amount of oil may pass to the exhaust tube 270, hence resulting in a rapid downward stroke of the file 40, or by restricting the flow of oil through manipulation of the valve plunger 263, the oil passing from tube 241 through the valve mechanism to the discharge tube 270, may be regulated to a minute degree and the downward stroke or cutting stroke of the file 40 correspondingly reduced in speed.

The passage 187 as shown in Figure 9 is in communication with a tube 272 which, when the valve 168 is in a position to direct fluid pressure into passage 187, i. e. during the downward stroke of piston 135, conveys oil under pressure through the tube 272 to the valve chamber 273 contained in the housing 245. By manipulating the knob 278 and hence the valve plunger 276, oil pressure is transmitted through the tube 282 to the cylinder 283 (Fig. 3) disposed beneath the work supporting table 76. In this manner a hydraulic impulse is imparted to the piston 284 and hence the screws 288 to the work piece W to momentarily urge the latter toward the file or cutting instrument only during the downward movement or cutting stroke of the file. It should be noted that after the piston 135 and the file 40 have reached their downward limits of movement, and the valve 168 rotated in a counter-clockwise direction until the arm 146 is in the dotted position as shown in Figure 9, the oil pressure is relieved in the tube 282 and tube 272, as they are then vented to the reservoir 12 through passages 187, 172, and 174 to the fluid exhaust outlet 221 so as to reduce the pressure to zero in these fluid lines during the idle or upward stroke of the file or cutting tool 42. Thus, during the idle stroke, the work W is not being urged toward the file by hydraulic pressure, the latter being effective only during a cutting stroke.

It should be noted the effective stroke of the cutting file or tool 40 may be regulated by changing the relative positions of the stops or abutments 156, 157 carried by the rod 153. This may be accomplished by manipulation of the abutment retaining screws 158.

It should be further noted that the piston rod 130 is of a comparatively large diameter as shown in Figure 6, and the space occupied by the piston rod in the lower part of the cylinder coupled with the space occupied by the tapered boss 140 and the skirt portion 139 of the piston 135, greatly reduces the volumetric space in the cylinder 133 beneath the piston 135. Thus there is comparatively small space beneath the piston 135 to receive fluid to effect the upward stroke of the piston, and hence the return or idle stroke of the cutting tool 40 is effected very rapidly, as it requires only a small amount of fluid to effect a complete return stroke.

It is apparent that, within the scope of the invention, modifications and different arrangements may be made other than is herein disclosed, and the present disclosure is illustrative merely, the invention comprehending all variations thereof.

What I claim is:

1. In a device of the character disclosed, in combination, a frame, a cylinder supported upon the frame, a piston reciprocable in said cylinder, a pair of passages connected, respectively, to opposite ends of said cylinder, an exhaust duct connected with each passage, a valve chamber, a plate valve reciprocable in said valve chamber between two opposite end positions, said valve having an inlet port and two outlet ports, spaced, respectively, from one another, said valve being constructed so that said inlet port communicates alternately with the two passages at the opposite ends of the valve movement and so that said outlet ports communicate, respectively, with said two exhaust ducts, respectively, at said opposite ends of the valve movement, said valve being so constructed, also, that when one of its outlet ports communicates with one of said exhaust ducts the other exhaust duct is shut off by said valve and the inlet port is in communication with the passage to which said other exhaust duct is connected, a source of fluid pressure, means connecting said source of fluid pressure with said inlet port in both end positions of said valve, two spaced discharge ducts aligned, respectively, with said two exhaust ducts to register, with the two outlet ports when the outlet ports are in comunication, respectively, with the exhaust ducts, whereby to conduct off fluid flowing from an exhaust duct through an outlet port, and an oscillating valve connected to said piston to be oscillated thereby for directing pressure fluid alternately to opposite ends of said valve chamber to reciprocate said plate valve in said valve chamber.

2. In a device of the character disclosed, in combination, a frame, a cylinder supported upon the frame, a piston reciprocable in said cylinder, a pair of passages connected, respectively, to opposite ends of said cylinder, an exhaust duct connected with each passage, a valve chamber, a plate valve reciprocable in said valve chamber between two opposite end positions, said valve having an inlet port and two outlet ports, said inlet port being disposed intermediate said outlet ports and said outlet ports being disposed in line with one another in the direction of reciprocation of said valve but offset to one side of said inlet port, said inlet port being located to communicate alternately with said two passages, respectively, at opposite ends of the valve movement and said two outlet ports being disposed to comunicate, respectively, with the two exhaust ducts, respectively, at said opposite ends of the valve movement, said two outlet ports being spaced further apart in the direction of movement of said valve than the ends of said two exhaust ducts which communicate therewith and the said communicating ends of the two exhaust ducts being spaced further apart in the said direction than the ends of the passages which communicate with said inlet port, said valve being so constructed that when one of its outlet ports communicates with one of said exhaust ducts the other exhaust duct is shut off by said valve and said inlet port is in communication with the passage to which said other exhaust duct is connected, a source of fluid pressure, means connecting said source of fluid pressure with said inlet port in both end positions of said valve, two spaced discharge ducts aligned, respectively, with said two exhaust ducts to register, respectively, with the two outlet ports when the outlet ports are in communication, respectively, with the exhaust ducts, whereby to conduct off fluid flowing from an exhaust duct through an outlet port, and an oscillatory valve connected to said piston to be oscillated thereby for directing pressure fluid alternately to opposite ends of said valve chamber to reciprocate said plate valve in said valve chamber.

3. In a device of the character disclosed, in combination, a frame, a cylinder supported upon the frame, a piston reciprocable in said cylinder, a pair of passages leading, respectively, from two supply openings in one side of said cylinder to opposite ends, respectively, of said cylinder, an exhaust duct connected with each passageway, said exhaust ducts leading, respectively, to two exhaust openings in said one side of said cylinder, a valve chamber mounted at said one side of said cylinder to adjoin the same, a plate valve reciprocable in said valve chamber, said one side of said cylinder having a surface on which said plate valve slides, said plate valve having an inlet port and two outlet ports, said inlet port being disposed intermediate said outlet ports and said outlet ports being disposed in line with one another in the direction of reciprocation of said valve but offset to one side of said inlet port, said inlet port being located to communicate alternately with said two supply openings, respectively, at opposite ends of the valve movement and said two outlet ports being disposed to communicate, respectively, with said two exhaust openings, respectively, at said opposite ends of the valve movement, said two outlet ports being spaced further apart in the direction of movement of said valve than said two exhaust openings and said two exhaust openings being spaced further apart in the said direction than said supply openings, said valve being so constructed that when one of its outlet ports communicates with one of said exhaust openings the other exhaust opening is shut off by said valve and the inlet port of the valve is in communication with the supply opening of the passage to which said other exhaust opening is connected, a manifold, a source of fluid pressure, means for conducting pressure fluid from said source to said manifold, ducts for connecting said means with said inlet port in both end positions of said valve, two spaced discharge ducts aligned, respectively, with said two exhaust openings to register, respectively, with the two outlet ports when the outlet ports are in communication, respectively, with the exhaust openings, whereby to conduct off fluid flowing from an exhaust opening through an outlet port, an oscillatory valve, a duct connecting said oscillatory valve to said manifold to supply pressure fluid to said oscillatory valve, ducts for connecting said oscillatory valve with opposite ends of said valve chamber, means for connecting said oscillatory valve to said piston to oscillate said oscillatory valve on reciprocation of said piston thereby to direct the pressure fluid alternately to opposite ends of said valve chamber to reciprocate said plate valve in said valve chamber, a manually adjustable valve for throttling the exhaust from one side of said cylinder, and a relief valve connected with said manifold for maintaining a constant fluid pressure in the fluid circuits to said cylinder and to said oscillatory valve.

EDD C. OLIVER.

REFERENCES CITED

The following references are of record in the file of this patent:

UNITED STATES PATENTS

| Number | Name | Date |
|---|---|---|
| 261,485 | Royce | July 18, 1882 |
| 312,488 | McKinnis | Feb. 17, 1885 |
| 558,473 | Berger | Apr. 21, 1896 |
| 847,028 | Springer | Mar. 2, 1907 |
| 1,116,640 | Sporleder | Nov. 10, 1914 |
| 1,817,180 | Drake | Aug. 4, 1931 |
| 1,881,012 | Wiltse | Oct. 4, 1932 |
| 1,901,154 | Durdin | Mar. 14, 1933 |
| 1,931,452 | Wheeler | Oct. 17, 1933 |
| 1,956,983 | Lapointe | May 1, 1934 |
| 2,101,507 | Oliver | Dec. 7, 1937 |
| 2,157,240 | Keel | May 9, 1939 |
| 2,182,289 | Eisenlohr | Dec. 5, 1939 |
| 2,216,486 | Cooke | Oct. 1, 1940 |
| 2,345,837 | Smith | Apr. 4, 1944 |
| 2,363,760 | Waldie | Nov. 28, 1944 |
| 2,365,987 | Zimmerman | Dec. 26, 1944 |
| 2,385,084 | Koppelman | Sept. 18, 1945 |
| 2,392,074 | Wasson | Jan. 1, 1946 |
| 2,432,305 | Geiger | Dec. 9, 1947 |